(12) United States Patent
Park et al.

(10) Patent No.: US 12,744,278 B2
(45) Date of Patent: Sep. 22, 2026

(54) BATTERY MODULE, AND BATTERY PACK AND VEHICLE COMPRISING SAME

(71) Applicant: LG ENERGY SOLUTION, LTD., Seoul (KR)

(72) Inventors: Jin-Yong Park, Daejeon (KR); Ho-June Chi, Daejeon (KR); Jhin-Ha Park, Daejeon (KR); Jae-Min Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 701 days.

(21) Appl. No.: 18/021,346

(22) PCT Filed: Jun. 9, 2022

(86) PCT No.: PCT/KR2022/008168

§ 371 (c)(1),
(2) Date: Feb. 14, 2023

(87) PCT Pub. No.: WO2022/265299

PCT Pub. Date: Dec. 22, 2022

(65) Prior Publication Data

US 2023/0299412 A1 Sep. 21, 2023

(30) Foreign Application Priority Data

Jun. 17, 2021 (KR) ........................ 10-2021-0078975

(51) Int. Cl.
*H01M 50/342* (2021.01)
*H01M 50/262* (2021.01)
*H01M 50/30* (2021.01)

(52) U.S. Cl.
CPC ..... *H01M 50/3425* (2021.01); *H01M 50/262* (2021.01); *H01M 50/30* (2021.01)

(58) Field of Classification Search
CPC ........... H10M 50/3425; H10M 50/262; H10M 50/30; H10M 50/325
See application file for complete search history.

(56) References Cited

U.S. PATENT DOCUMENTS 5,766,790 A * 6/1998 Kameishi ............ H01M 50/581 429/57
6,187,469 B1 * 2/2001 Marincic ................ H01M 6/44 429/94

(Continued)

FOREIGN PATENT DOCUMENTS

CN 102969469 A 3/2013
CN 204230326 U * 3/2015

(Continued)

OTHER PUBLICATIONS

English machine translation of KR20160112768A (Year: 2016).*

(Continued)

*Primary Examiner* — Kourtney R S Carlson
(74) *Attorney, Agent, or Firm* — Birch, Stewart, Kolasch & Birch, LLP

(57) ABSTRACT

A battery module includes a plurality of battery cells; a case in which the plurality of battery cells are accommodated; and a fastening member fastened to the case, and gas generated inside the case is discharged through the fastening member. The battery module can be used in a battery pack and electric vehicle.

12 Claims, 6 Drawing Sheets

(56) References Cited

U.S. PATENT DOCUMENTS

| | | | | |
|---|---|---|---|---|
| 2012/0183824 | A1 | 7/2012 | Cho et al. | |
| 2014/0227565 | A1 | 8/2014 | Wan et al. | |
| 2015/0243950 | A1* | 8/2015 | Hara | B60K 1/04 429/99 |
| 2021/0249731 | A1 | 8/2021 | You et al. | |
| 2022/0123423 | A1 | 4/2022 | Wang et al. | |
| 2022/0123427 | A1 | 4/2022 | Ren et al. | |
| 2022/0231376 | A1 | 7/2022 | Yoo et al. | |

FOREIGN PATENT DOCUMENTS

| | | | | | |
|---|---|---|---|---|---|
| CN | 204289576 | U | | 4/2015 | |
| EP | 1 156 540 | A2 | | 11/2001 | |
| EP | 1 519 430 | A2 | | 3/2005 | |
| JP | 2006-210257 | A | | 8/2006 | |
| JP | 2009-231180 | A | | 10/2009 | |
| JP | 2011-76762 | A | | 4/2011 | |
| JP | 2011076762 | A | * | 4/2011 | |
| JP | 5002971 | B2 | | 8/2012 | |
| JP | 2016-139483 | A | | 8/2016 | |
| JP | 2020-113488 | A | | 7/2020 | |
| JP | 6836738 | B2 | | 3/2021 | |
| KR | 20-0236503 | Y1 | | 10/2001 | |
| KR | 10-2005-0007921 | A | | 1/2005 | |
| KR | 10-2012-0083681 | A | | 7/2012 | |
| KR | 10-1316319 | B1 | | 10/2013 | |
| KR | 10-2014-0109370 | A | | 9/2014 | |
| KR | 10-2016-0112768 | A | | 9/2016 | |
| KR | 20160112768 | A | * | 9/2016 | H01M 10/052 |
| KR | 10-2017-0000070 | A | | 1/2017 | |
| KR | 10-2168725 | B1 | | 10/2020 | |
| KR | 10-2021-0068862 | A | | 6/2021 | |
| KR | 102415558 | B1 | * | 7/2022 | H01M 10/482 |
| WO | WO 2020/134054 | A1 | | 7/2020 | |
| WO | WO 2021/088570 | A1 | | 5/2021 | |
| WO | WO 2021/097644 | A1 | | 5/2021 | |

OTHER PUBLICATIONS

English machine translation of CN 204230326U (Year: 2015).*

Extended European Search Report for European Application No. 22825224.3, dated Jun. 27, 2024.

International Search Report for PCT/KR2022/008168 mailed on Sep. 21, 2022.

Machine translation of CN-204230326-U, published on Mar. 25, 2015.

* cited by examiner

BATTERY MODULE, AND BATTERY PACK AND VEHICLE COMPRISING SAME

TECHNICAL FIELD

The present application claims priority to Korean Patent Application No. 10-2021-0078975 filed on Jun. 17, 2021, in the Republic of Korea, the disclosures of which are incorporated herein by reference.

The present disclosure relates to a battery module, and a battery pack and a vehicle including the battery module, and more particular, to a battery module, which may smoothly discharge gas generated in a case, and a battery pack and a vehicle including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same. In addition, various types of secondary batteries include a case capable of protecting the battery cells, a battery module in which a plurality of battery cells are stacked and inserted into the case, and a battery pack including a plurality of battery modules.

Meanwhile, a lithium secondary battery may generate gas inside the secondary battery during charging and discharging of the secondary battery, and this gas may cause damage to the secondary battery as well as an explosion or ignition, which is more problematic.

In particular, if the secondary battery explodes or catches fire, this may not only damage a device to which the secondary battery is applied, but also cause injuries to a user who uses the secondary battery. Also, due to the damage to the exterior of the secondary battery, an electrolyte inside the secondary battery may leak and cause damage such as short circuit or electric shock.

Moreover, since a battery-powered hybrid electric vehicle, an electric vehicle, or an energy storage system has a very large output and capacity, the damage caused by the generation of internal gas may become more serious.

In order to solve various problems caused by the generation of gas, a structure for discharging gas when the gas is generated inside the secondary battery may be provided.

In the prior art, a venting hole for discharging gas is formed in the case, but there is a problem in that the gas may not be smoothly discharged through the venting hole formed in the case.

DISCLOSURE

Technical Problem

Therefore, the present disclosure is directed to providing a battery module, which may smoothly discharge gas when the gas is generated in a case, and a battery pack and a vehicle including the battery module.

Technical Solution

In one aspect of the present disclosure, there is provided a battery module, comprising: a plurality of battery cells; a case in which the plurality of battery cells is accommodated; and a fastening member fastened to the case, wherein gas generated inside the case is discharged through the fastening member.

In addition, a venting hole through which the gas is discharged may be formed in the fastening member.

Also, the fastening member may include a bolt disposed from a lower side of the an inside of the case toward an upper side of the case to protrude to an outside of the case and having a male thread portion, the venting hole being formed in the bolt; and a nut having a female thread portion to be coupled to the bolt at an outer side of the case.

In addition, the fastening member may include a bolt disposed from an inner side of the case toward a side surface of the case to protrude to an outside of the case and having a male thread portion, the venting hole being formed in the bolt; and a nut having a female thread portion to be coupled to the bolt at an outer side of the case.

Also, a female thread portion may be formed on the case, and the fastening member may be a screw disposed from a lower side of an inside of the case toward an upper side of the case to protrude to an outside of the case and having a male thread portion formed to be fastened with the female thread portion of the case, the venting hole being formed in the screw.

In addition, the fastening member may include a body portion in which the venting hole is formed; and a rupturing portion coupled to an end of the body portion and ruptured by the gas generated inside the case.

Also, the rupturing portion may be formed thinner than the body portion.

In addition, a rupturing groove may be formed on the rupturing portion so that the rupturing portion is ruptured by a pressure of the gas.

Also, the body portion and the rupturing portion may be made of different materials.

In addition, the body portion may be made of a metal material, and the rupturing portion may be made of a composite resin material.

Meanwhile, in another aspect of the present disclosure, there is also provided a battery pack comprising the battery module or a vehicle comprising the battery module.

Advantageous Effects

According to the embodiments of the present disclosure, since the gas may be discharged through the fastening member, the gas generated inside the case may be smoothly discharged.

BEST MODE

Figures 1, 2:
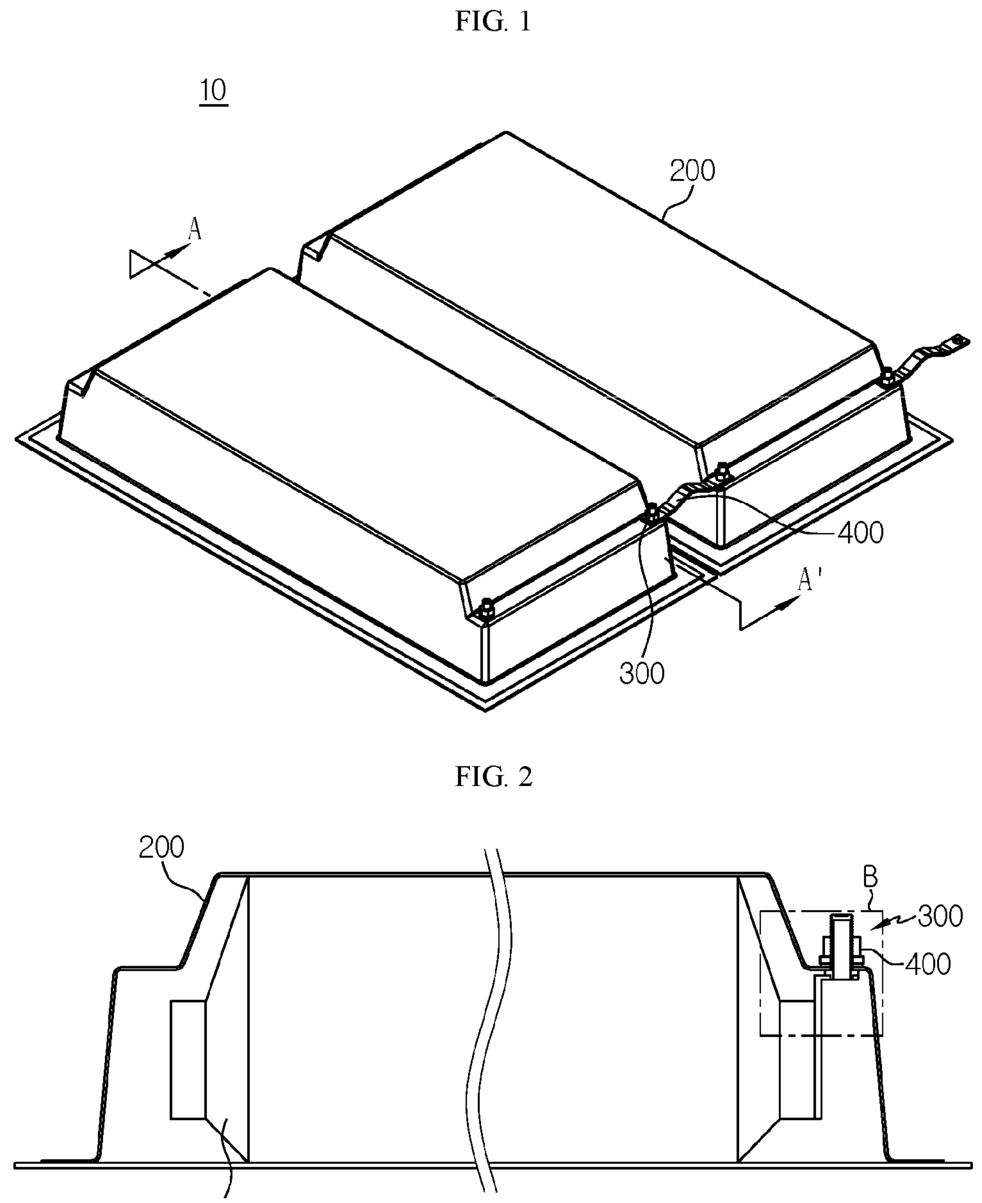
FIG. 1 is a perspective view showing a battery module according to an embodiment of the present disclosure as a whole.
FIG. 2 is a cross-sectional view taken along line A-A' of FIG. 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 3:
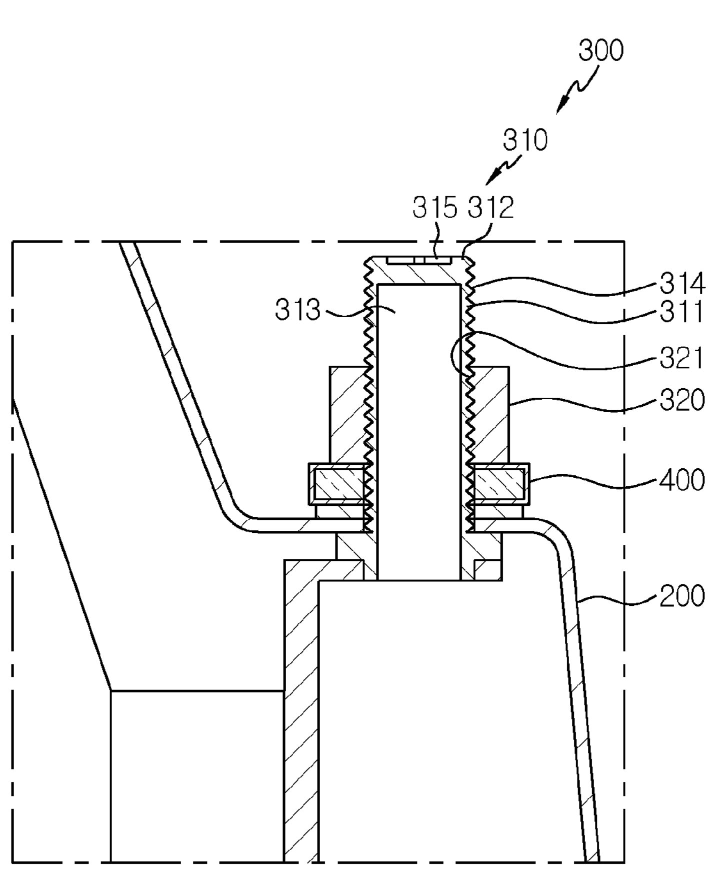
FIG. 3 is an enlarged view showing a portion B of FIG. 2.
Figure 4:
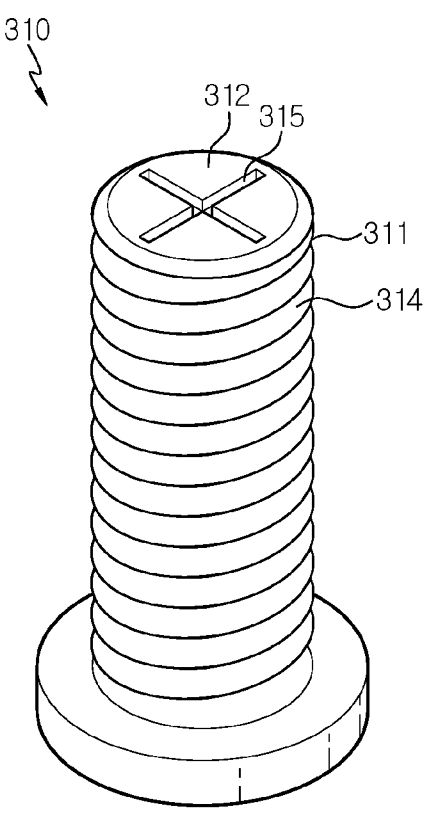
FIG. 4 is a perspective view showing a bolt in a fastening members of the battery module according to an embodiment of the present disclosure.
Figure 5:
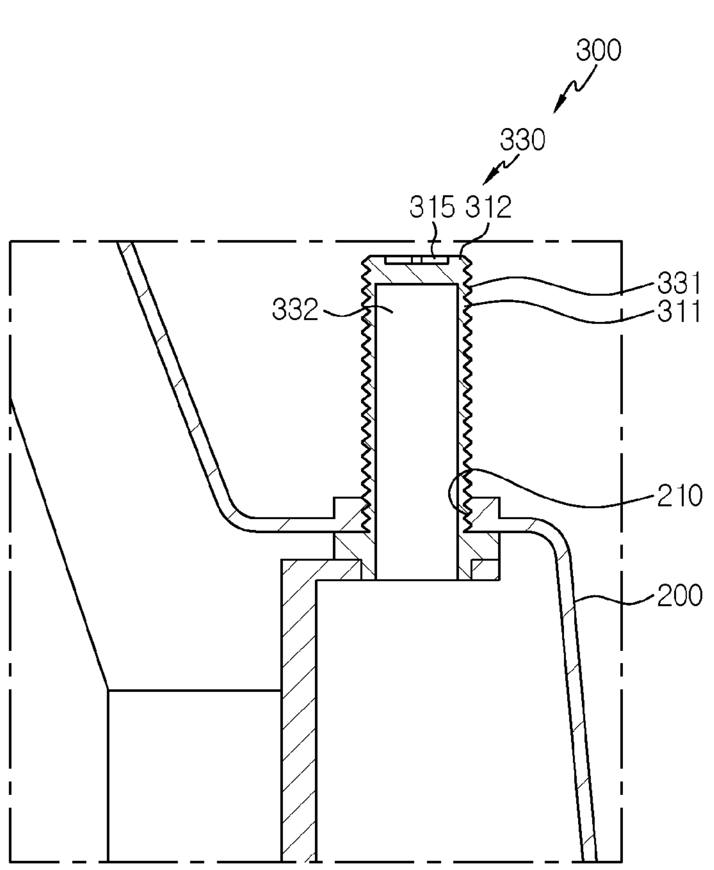
FIG. 5 is a diagram showing another embodiment of FIG. 3.
Figure 6:
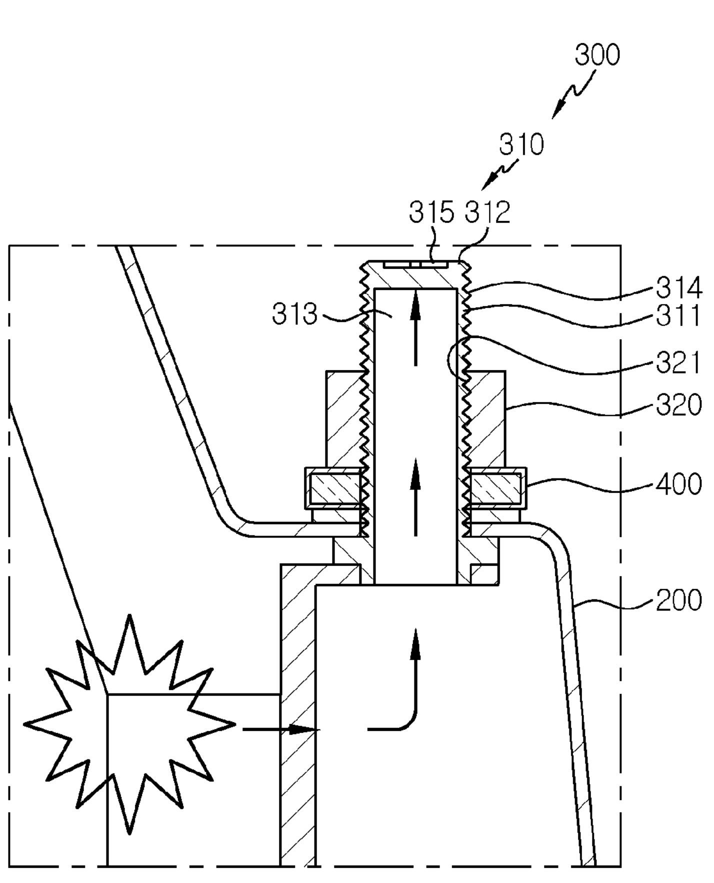
FIGS. 6 and 7 are diagrams for illustrating a process in which gas inside a case is discharged through the fastening member in the battery module according to an embodiment of the present disclosure.
Figure 7:
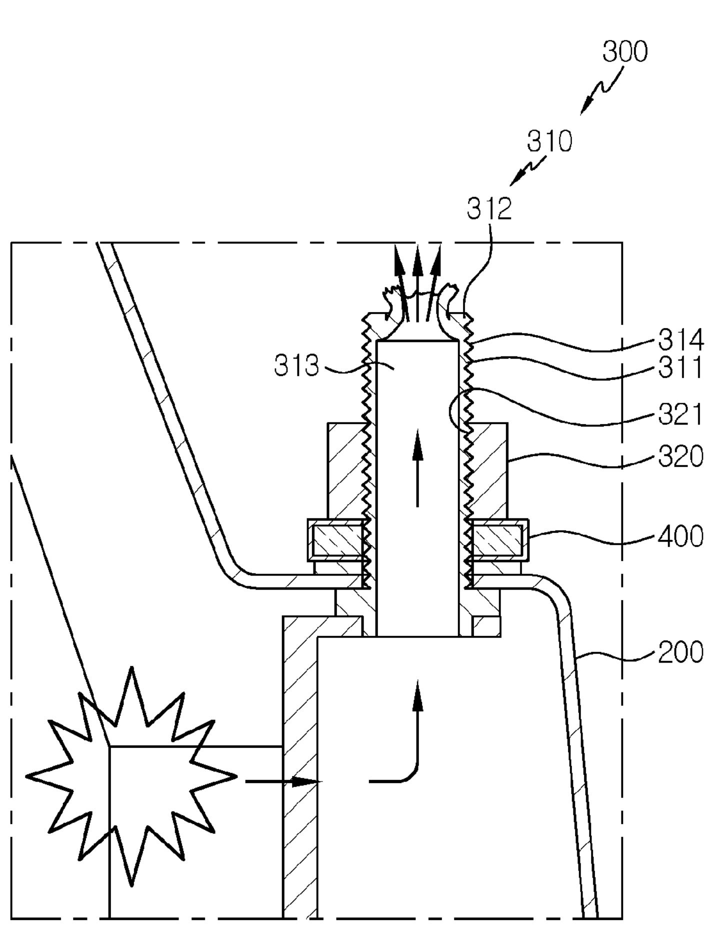

FIG. 1 is a perspective view showing a battery module according to an embodiment of the present disclosure as a whole, FIG. 2 is a cross-sectional view taken along line A-A' of FIG. 1, FIG. 3 is an enlarged view showing a portion B of FIG. 2, FIG. 4 is a perspective view showing a bolt in a fastening members of the battery module according to an embodiment of the present disclosure, FIG. 5 is a diagram showing another embodiment of FIG. 3, and FIGS. 6 and 7 are diagrams for illustrating a process in which gas inside a case is discharged through the fastening member in the battery module according to an embodiment of the present disclosure.

Referring to the drawings, a battery module 10 according to an embodiment of the present disclosure includes a plurality of battery cells 100, a case 200, and a fastening member 300.

Referring to FIGS. 1 and 2, a plurality of battery cells 100 are accommodated in the case 200 and protected. Here, the battery cell 100 may be diverse. For example, the battery cell 100 may be provided as a pouch-type battery cell or as a cylindrical battery cell.

The battery cell 100 includes an electrode lead, and the electrode lead provided in the battery cell 100 is a type of terminal connected to an external device, and a conductive material may be used.

The electrode leads may include a positive electrode lead and a negative electrode lead. The positive electrode lead and the negative electrode lead may be disposed in opposite directions with respect to the longitudinal direction of the battery cell 100, or the positive electrode lead and the negative electrode lead may be located in the same direction with respect to the longitudinal direction of the battery cell 100.

The positive electrode lead and the negative electrode lead may be made of various materials. For example, the positive electrode lead may be made of an aluminum material, and the negative electrode lead may be made of a copper material.

The electrode leads may be electrically coupled to a bus bar 400. The battery cell 100 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The plurality of battery cells 100 may be accommodated in the case 200 in various ways, and, for example, the plurality of battery cells 100 may be stacked on each other and accommodated in the form of a battery cell stack. Here, the battery cell 100 may have various structures, and the plurality of battery cells 100 may be stacked in various ways.

The battery cell stack may include a plurality of cartridges (not shown) for respectively accommodating the battery cells 100. Each cartridge (not shown) may be manufactured by injection-molding plastic, and a plurality of cartridges (not shown), each having an accommodation portion capable of accommodating the battery cell 100, may be stacked.

A cartridge assembly in which the plurality of cartridges (not shown) are stacked may have a connector element or a terminal element. The connector element may include, for example, various types of electrical connection parts or members for connection to a battery management system (BMS) that may provide data on voltage or temperature of the battery cell 100.

In addition, the terminal element includes a positive terminal and a negative terminal as main terminals connected to the battery cell 100.

Referring to FIGS. 1 and 2, a plurality of battery cells 100, for example, a battery cell stack or a cartridge assembly in which the battery cell stack is accommodated, is accommodated in the case 200.

Here, the case 200 may be provided to surround the battery cell stack formed by the battery cells 100 or the cartridge assembly in which the battery cell stack is accommodated. That is, the case 200 surrounds the entire battery cells 100 and thereby protects the battery cells 100 from external vibration or impact.

The case 200 may be formed in a shape corresponding to the shape of the battery cells 100, for example, the battery cell stack or the cartridge assembly. For example, when the battery cell stack or the cartridge assembly is provided in a hexahedral shape, the case 200 may also be provided in a hexahedral shape to correspond thereto.

The battery cells 100 accommodated in the case 200 generate gas therein during the charging and discharging process, and the gas generated inside the case 200 in this way is discharged through the fastening member 300. Here, the fastening member 300 may have a venting hole 313 through which the gas may be discharged. This will be described later in detail.

The fastening member 300 is fastened to the case 200. The fastening member 300 may fasten the case 200 itself, or may be coupled to the case 200 to fix the bus bar 400.

The fastening member 300 may be configured to include a bolt 310 and a nut 320 as an embodiment, and may also be configured to include a screw 330 coupled directly to the case 200 as another embodiment.

First, an embodiment in which the fastening member 300 includes a bolt 310 and a nut 320 will be described.

Referring to FIGS. 2 and 3, the bolt 310 is disposed from a lower side of the inside of the case 200 toward an upper side to protrude to the outside of the case 200. In addition, the venting hole 313 is formed in the bolt 310.

In addition, although not shown in the drawings, as another embodiment with respect to FIGS. 2 and 3, the bolt 310 may be disposed from an inner side of the case 200 toward a side surface to protrude to the outside of the case 200. Here, the venting hole 313 is formed in the bolt 310.

Meanwhile, in another embodiment, the bolt 310 may be disposed from the inner side of the case 200 toward a bottom to protrude to the outside of the case 200.

Here, for example, the bolt 310 may include a body portion 311 and a rupturing portion 312. The venting hole 313 is formed in the body portion 311. That is, the hollow venting hole 313 through which gas can move is formed inside the body portion 311. Here, referring to FIGS. 3 and 4, a male thread portion 314 is formed around the outer circumference of the body portion 311.

In addition, the rupturing portion 312 is coupled to an end of the body portion 311 and is provided to be ruptured by the gas generated inside the case 200. That is, when the gas pressure inside the case 200 exceeds a preset value, the rupturing portion 312 may be ruptured. As seen in the cross-sectional view of FIG. 3, the rupturing portion 312 is unitarily formed with an end of the body portion 311.

Referring to FIG. 4, the rupturing portion 312 may be formed thinner than the body portion 311 so as to be ruptured by gas pressure.

Alternatively, a rupturing groove 315 may be formed on the rupturing portion 312 so that the rupturing portion 312 may be easily ruptured by gas pressure. Here, although the rupturing groove 315 is formed in a cross shape in FIG. 4, the shape of the rupturing groove 315 may be diverse.

Meanwhile, the body portion 311 and the rupturing portion 312 may be made of different materials. For example, the body portion 311 may be made of a metal material in consideration of rigidity, and the rupturing portion 312 may be made of various composite resin materials to facilitate rupture.

The rupturing portion 312 may be made of, for example, a thin plastic material to be easily ruptured.

For example, the rupturing portion 312 may be made of a polyethylene film, but the material of the rupturing portion 312 is not limited thereto.

In addition, the body portion 311 and the rupturing portion 312 made of different materials may be prepared by an insert injection method. However, the manufacturing method is not limited to insert injection.

The nut 320 is coupled to the bolt 310 at an outer side of the case 200. A female thread portion 321 that may correspond to the male thread portion 314 of the bolt 310 is formed on the nut 320.

Referring to FIG. 2, the bolt 310 is disposed from the lower side of the inside of the case 200 toward the upper side, and the nut 320 is provided to be coupled to the bolt 310 at the outer side of the case 200. That is, the bolt 310 is located at the inner side of the case 200, and the nut 320 is located at the outer side of the case 200.

Alternatively, the bolt 310 may be disposed to face the side surface from the inner side of the case 200, and the nut 320 may be provided to be coupled to the bolt 310 at the outer side of the case 200. Also in this case, the bolt 310 is located at the inner side of the case 200, and the nut 320 is located at the outer side of the case 200.

In addition, the bus bar 400 may be interposed and fixed between the bolt 310 and the nut 320. In FIG. 2, the bolt 310 and the nut 320, which serve as the fastening member 300, are shown to fix the bus bar 400, but the bolt 310 and the nut 320 may be provided to fix only the case 200 or may be provided to fix both the case 200 and the bus bar 400.

Here, the movement direction of gas may be guided according to the arrangement direction of the bolt 310. That is, since the gas generated inside the case 200 moves along the venting hole 313 formed in the bolt 310, if the bolt 310 is disposed from the lower side to the upper side of the case 200 as shown in FIG. 2, the gas may be discharged to the outside of the case 200 while moving along the venting hole 313 from the lower side toward the upper side of the case 200.

Alternatively, if the bolt 310 is disposed to face the side surface of the case 200, the gas may be discharged to the outside of the case 200 while moving along the venting hole 313 toward the side surface of the case 200.

That is, since the gas generated inside the case 200 moves along the venting hole 313 formed in the body portion 311 of the bolt 310, the body portion 311 may guide the movement direction of gas, thereby discharging the gas in the direction desired by a user.

Meanwhile, since the fastening member 300 has both the function of fastening the case 200 or the function of fastening the bus bar 400 as well as the gas discharge function as described above, both functions are possible with only the fastening member 300, and a separate component is not necessary to discharge the gas, thereby giving an effect of facilitating the production and reducing the cost.

Next, as another embodiment of the fastening member 300, an embodiment in which the fastening member 300 includes a screw 330 having a male thread portion 331 formed on a periphery thereof to be directly coupled to the case 200 will be described. Though the bolt 310 is coupled to the nut 320, the screw 330 is directly coupled to the case 200, different from the former embodiment. Other basic configuration of the screw 330, for example the body portion and the rupturing portion, is common with the bolt 310, so the common portion of the screw 330 and the bolt 310 is replaced with the above description of the bolt 310.

Referring to FIG. 5, the case 200 has a female thread portion 210. In addition, when the fastening member 300 includes only the screw 330, the nut 320 is unnecessary, and the male thread portion 331 formed on the screw 330 is coupled to the female thread portion 210 formed on the case 200.

Here, the fastening member 300 is disposed from the lower side of the inside of the case 200 toward the upper side, similar to the bolt 310 and is fastened to the female thread portion 210 of the case 200 to protrude to the outside of the case 200. In addition, a venting hole 332 is formed in the screw 330.

As shown in FIG. 5, the screw 330 may be used for fastening and fixing the case 200 rather than the bus bar 400. However, the present disclosure is not limited thereto, and the screw 330 may be provided to fix the bus bar 400 together with other members, for example, a washer, if necessary.

Hereinafter, the operation and effect of the battery module 10 according to an embodiment of the present disclosure will be described with reference to the drawings.

In the battery module 10 according to an embodiment of the present disclosure, a plurality of battery cells 100 are accommodated in the case 200, and a fastening member 300 for fixing the case 200 or fixing the bus bar 400 or the like is fastened to the case 200.

Here, venting holes 313, 332 having a hollow shape through which gas may move may be formed inside the fastening member 300.

Referring to FIG. 6, gas is generated inside the case 200 so that the gas pressure presses the rupturing portion 312 of the bolt 310, and referring to FIG. 7, the rupturing portion 312 is ruptured by the gas pressure so that the gas inside the case 200 is discharged to the outside of the case 200.

Accordingly, there is an effect that the gas generated inside the case 200 can be smoothly discharged.

Meanwhile, a battery pack (not shown) according to another embodiment of the present disclosure may include at least one battery module 10 according to an embodiment of the present disclosure as described above. Also, in addition to the battery modules 10, the battery pack (not shown) may further include a housing for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, a battery pack and a vehicle including the same, and in particular, it may be used in industries related to secondary batteries.

What is claimed is:

1. A battery module, comprising:
a plurality of battery cells;
a case in which the plurality of battery cells is accommodated; and
a bolt fastened to the case, wherein the bolt comprises:
a cylindrical body portion in which a venting hole is formed along a longitudinal axis; and
a disc-shaped rupturing portion unitarily formed with an end of the body portion and ruptured by gas generated inside the case,
wherein the gas generated inside the case is discharged through the bolt.

2. The battery module according to claim 1,
wherein the bolt is disposed from a lower side of an inside of the case toward an upper side of the case to protrude to an outside of the case and having a male thread portion, and further comprising:
a nut having a female thread portion to be coupled to the bolt at an outer side of the case.

3. The battery module according to claim 1,
wherein the bolt is disposed from an inner side of the case toward a side surface of the case to protrude to an outside of the case and having a male thread portion, and further comprising:
a nut having a female thread portion to be coupled to the bolt at an outer side of the case.

4. The battery module according to claim 1, wherein a female thread portion is formed on the case, and
wherein the bolt is disposed from a lower side of an inside of the case toward an upper side of the case to protrude to an outside of the case and having a male thread portion formed to be fastened with the female thread portion of the case.

5. The battery module according to claim 1, wherein the rupturing portion is formed thinner than the body portion.

6. The battery module according to claim 1, wherein a rupturing groove is formed on the rupturing portion so that the rupturing portion is ruptured by a pressure of the gas.

7. The battery module according to claim 1, wherein the body portion and the rupturing portion are made of different materials.

8. The battery module according to claim 7, wherein the body portion is made of a metal material, and the rupturing portion is made of a composite resin material.

9. The battery module according to claim 1, further comprising a bus bar connected to the bolt outside of the case,
wherein the bus bar is electrically connected to electrode leads of the plurality of battery cells.

10. The battery module according to claim 9, further comprising a connector attached to the bolt inside the case and attached to the electrode leads of the plurality of battery cells.

11. A battery pack, comprising the battery module according to claim 1.

12. A vehicle, comprising the battery module according to claim 1.

* * * * *